Patented Dec. 26, 1950

2,535,922

UNITED STATES PATENT OFFICE 2,535,922

ISOPHORONE IMINES

Vernon E. Haury, El Cerrito, and Seaver A. Ballard, Orinda, Calif., assignors to Shell Development Company, San Francisco, Calif., a corporation of Delaware No Drawing. Application December 19, 1946, Serial No. 717,322

9 Claims. (Cl. 260—566)

This invention relates to a novel class of ketimines having especially advantageous properties. It deals particularly with new unsaturated isophorylidene ketimines which are useful components of insecticidal preparations and with an efficient and economical method for producing such ketimines.

The ketimines of the invention are characterized by an imine nitrogen atom which is linked by a double bond to an isophorylidene radical, i. e. a 3,5,5-trimethyl-$\Delta^2$-cyclohexenylidene radical

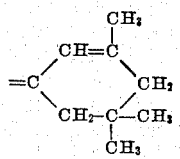

The imine nitrogen atom in the new compounds is also directly linked by a single bond to an unsaturated aliphatic or alicyclic hydrocarbon radical having a double bond between two carbon atoms, one of which is preferably directly attached to the carbon atom which is directly linked to the imine nitrogen atom. The preferred isophorylidene ketimines of the invention contain eleven to about twenty carbon atoms per molecule.

These new ketimines have unexpectedly valuable properties due to their unique structure, particularly the characteristic arrangement of the three methyl groups and the olefinic double bond in the isophorylidene radical and the unsaturated nature of the other radical attached to the imine nitrogen atom. These structural features give the new compounds many industrially important applications in which previous ketimines are unsuitable or much less desirable. The new ketimines may, for instance, be used in insecticidal compositions where they are unusually irritating to insects, particularly flies, and cause a violent paralysis. They may also be used as compounding agents for rubber, and as intermediates in the synthesis of other types of valuable organic compounds. They are useful in the preparation of corrosion inhibitors for lubricating oils and in the synthesis of improved wetting agents, and may be used as starting materials for the production of secondary amines. Due to their unsaturated character they may be copolymerized with polymerizable unsaturated compounds such as vinyl chloride, methyl methacrylate, diallyl phthalate, butadiene, etc., to produce valuable plastics and resins. A preferred subgroup of the novel ketimines which are especially useful in such applications are those having an unsaturated terminal carbon atom, most preferably an unsaturated terminal carbon atom in a chain of not more than three carbon atoms directly attached to the imine nitrogen atom.

The imines of the present invention may be readily and economically prepared in high yields by reacting a primary aliphatic or alicyclic unsaturated amine, perferably having two to about twelve carbon atoms per molecule, with isophorone in the absence of a catalyst for condensation reactions. Most preferably the reaction is carried out under conditions which will favor or promote the elimination of water from the reaction mixture substantially as soon as it is formed therein. This object may be realized in a variety of different manners. It has been found especially efficient and desirable to carry out the reaction in a dehydrating still at about the boiling temperature of the reactants. By maintaining a heavy reflux in the column it is possible to withdraw the water from the reaction mixture substantially as soon as it is formed. When all of the water has been thus removed, the product may be fractionally distilled, thereby separating the imine from any unreacted amine or isophorone as well as from any by-products which may have been formed during the course of the reaction. This method of operation is a particularly rapid one, since in most cases the reaction may be completely carried out over a period of only from about one hour to about five hours. The rapidity of the present process does not, moreover, cut down the yield of product or result in the formation of an impure product since, as will be shown more fully hereinbelow, high yields of pure imine may be obtained.

If necessary or desirable because of the nature of the amine used, however, the above procedure may be varied to meet the requirements of each particular case. Thus, all or part of the imine may be distilled over together with the water from the reaction mixture and the water separated from the imine in a subsequent operation. If the nature of the imine is such that it forms an azeotropic mixture with water or with other constituents of the reaction mixture, the azeotropic mixture may be distilled over from the reaction vessel and the desired imine subsequently separated therefrom. This may be done by any suitable means, as by stratification, fractionation, extraction, salting out, use of drying agents, and the like. The imine may, if desired, be further purified or isolated in a pure state by subjecting the condensate to treatment in suitable fractionation equipment.

It may in some instances be desirable to carry out the reaction in the presence of an inert solvent in order to better control the reaction and to facilitate the removal of the water formed during the course of the reaction. Suitable substances for this purpose include any inert materials having a suitable boiling point which will act as mutual solvents for the reactants without entering into chemical combination therewith. Certain alcohols, esters, ethers, hydrocarbons, especially the aromatic hydrocarbons such as toluene, the xylenes, and the like exemplify suitable solvents to be used for this purpose.

The process of the invention may be executed in a batch, intermittent or continuous manner. When it is desired to execute the process in a continuous manner, a suitable reaction stage or stages in communication with one or a plurality of separation and purification stages may be provided. The volume of the reaction mixture and the relative concentrations of the reactants in the reaction stage or stages may be kept substantially constant by the intermittent or continuous introduction therein of the reactants at about the same rate at which they are reacted and the products removed from the reaction mixture. The reactants separated from the condensed distillate may be re-utilized by introducing them into a reaction stage as a mixture independently or in conjunction with the main reactant feed or feeds.

As an alternative mode of operation, the condensation may be effected in a reaction column into which the reactants may be introduced at one or a plurality of zones, the location of which zones is dependent upon the relative boiling temperatures of the particular reactants, products, and constant boiling mixtures which may be formed.

Imines may be prepared in accordance with the process disclosed herein by reacting a single unsaturated amine with isophorone, thus forming a single imine as a product. However, if it is desired to prepare a mixture of imines, this may be accomplished by reacting a mixture of different species of unsaturated amines with isophorone. The resulting mixture of imines may be used without resorting to separation of the constituents; or, if desired, separation of the imines may be effected by any suitable means, as by fractional distillation, if there is a sufficiently great difference in the boiling temperatures of the imines.

In the majority of cases, the condensation is effected by heating the reactants in contact with each other at the boiling temperature of the reaction mixture under atmospheric pressure. Superatmospheric pressures may be used if desired, however, as where it is expedient to accelerate the rate of the reaction by increasing the temperature at which it is carried out. Similarly, it may be advantageous to use subatmospheric temperatures in certain cases, as where boiling of the reaction mixture and distillation of the product cannot be effected at atmospheric pressure without decomposition of the reactants or of the product.

In the ordinary case, sufficiently intimate contact is maintained between the constituents of the reaction mixture by the ebullition of the contents of the reaction vessel. However, other means such as stirring, shaking, etc., may be resorted to if desirable in a given case.

A variety of primary unsaturated amines may be used as starting materials for the synthesis of imines by the process of the invention. These include those non-aromatic unsaturated amines which are members of the olefinic and cyclo-olefinic homologous series, i. e. those in which the imino groups are attached to a radical selected from the group consisting of the alkenyl and cyclo-alkenyl radicals. Diamines may be used as well as the mono-substituted compounds. Certain of the non-aromatic heterocyclic amines may also be used, e. g. those in which the hetero atom is oxygen, sulfur or nitrogen. Functional groups other than the amino groups may also be present in the molecule of the starting unsaturated amine provided these are of such a nature as to be non-reacting under the conditions of the reaction so as not to form undesirable by-products. Such functional groups include, for example, the halogen, hydroxyl and ether groups. Specific examples of primary unsaturated amines which may be used in the synthesis, therefore, are: vinylamine, allylamine, methallylamine, crotylamine, isocrotylamine, isopropenylamine, 1-amino-1-propene, 1-amino-1-butene, 1-amino-3-butene, 2-amino-1-butene, 2-amino-2-butene, 2-amino-3-butene, 1-amino-2-pentene, 3-amino-1-pentene, 3-amino-2-methyl-1-butene, 2-amino-1-hexene, 2-methyl-2-amino-4-pentene, 4-amino-4-octene, 3-methyl-3-amino-1-heptene, 1-amino-2-decene, 1-amino-2-undecene, 1-amino-2-dodecene, oleylamine, and like aliphatic unsaturated amines; and aminocyclopentene-1, aminocylopentene-2, aminocyclopentene-3, the aminocyclohexenes, 1-methyl-1-aminocyclopentene-2, 1-methyl-2-aminocyclopentene-1, 1-methyl-2-aminocyclopentene-5, 1-methyl-3-aminocyclohexene-1, 1-methyl-4-aminocyclohexene-2, 1-ethyl-1-aminocyclohexene-2, 1,1-dimethyl-2-aminocyclohexene-2, 1,1-dimethyl-5-aminocyclohexene-3, 1,3-dimethyl-5-aminocyclohexene-3, 1,1,3-trimethyl-5-aminocyclohexene-3 and similar alicyclic unsaturated amines.

As will be apparent from an inspection of the equation representing the condensation between the primary unsaturated amine and isophorone in accordance with the present invention

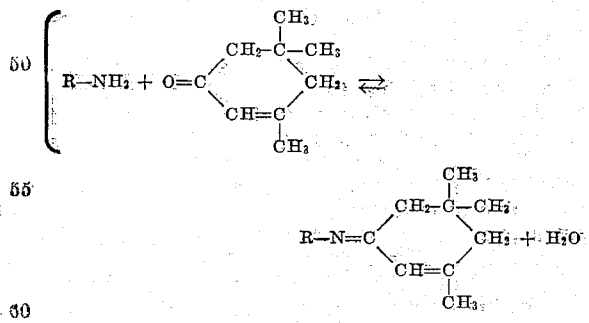

where R represents an unsaturated aliphatic or cycloaliphatic radical), one mol or equivalent weight of primary unsaturated amine should, theoretically, be used for each mol or equivalent weight of isophorone. However, since the reaction is an equilibrium reaction, the equilibrium may be shifted and the production of the desired imine favored by the use of an excess of one of the reactants. An excess of either the primary amine or of isophorone may be used, depending upon which one is the more readily available, which may be more readily separated from the product, and other considerations of a practical nature. Usually it is preferred to use an excess of the isophorone since it is often the more readily available and since in most cases the excess isophorone may be thoroughly and easily separated from the imine product. The amount in excess of the theoretical which may be used may vary with each particular preparation, although it has been found that, in general, a ratio of one equivalent of unsaturated amine to from about 1.25 to about 2.0 mols of isophorone is a preferred ratio.

The following examples in which the amounts are given in parts by weight illustrated one advantageous method of preparing the new unsaturated isophorylidene ketimines of the invention.

Example I

A mixture of two mols of isophorone, two mols of methallylamine, 200 cc. of benzene and 2 grams of zinc chloride is heated under a dehydration column with continuous removal of the water formed in the reaction. After about 4 hours of distillation the theoretical amount of water is removed and the remaining mixture is fractionated at 1–2 mm. pressure with the following results:

| Boiling Range of Fraction, °C. | Weight of Fraction |
| --- | --- |
| | Grams |
| 51–61° at 1–2 mm | 32 |
| 61–73° at 1–2 mm | 31 |
| 73–76° at 1–2 mm | 219 |
| 76–82° at 1–2 mm | 45 |
| Bottoms | 38 |

The material boiling between 73° C. and 76° C. at 1–2 mm. is N-methallyl isophoronimine

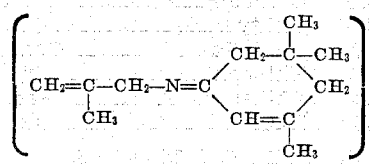

having an index of refraction $n_D^{20}$ 1.5020 and analyzing 7.05%–7.06% nitrogen. Yield, about 57.4% of the theoretical based on the starting isophorone or methallylamine.

Example II

Isophorone (2 mols), allylamine (2.35 mols), zinc chloride (3 grams), benzene (100 cc.) and petroleum ether (50 cc.) are heated together under a column having a phase separating head with constant removal of the water formed. After about 13 hours the removal of water appears to be complete and the catalyst is destroyed with sodium hydroxide. Distillation gives 132 grams of unreacted isophorone and 89 grams of N-allyl-isophoronimine boiling at 104° C.–104.5 C. under 10 mm. and having a refractive index $n_D^{20}$ 1.5050, a conversion of about 25% with a 48% yield.

Example III

A mixture of two mols isophorone, two mols of isocrotylamine, 200 cc. of benzene and 2 grams of zinc chloride is reacted as in Example I. After removal of the water formed in the reaction, distillation of the remaining mixture at about 1 mm. pressure gives a good yield of N-isocrotyl isophoronimine. The pure product analyzes about 7.3% nitrogen.

Reaction under the same conditions of 1-amino-2-undecene with isophorone gives N-(2-undecenyl) isophoronimine ($C_{20}H_{35}N$). In the same way N-oleylisophoronimine is obtained from oleyl amine and isophorone, and N-(1-methyl-1-vinyl-pentane) isophoronimine from 3-methyl-3-amino-1-heptene. Especially good yields are obtained when reacting isophorone with isophorylamine under the conditions of Example II, the product being N-isophorylisophoronimine

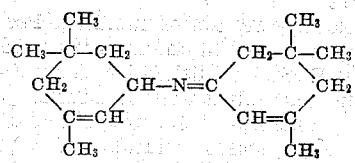

Under the same conditions N-(2-cyclopentenyl) isophoronimine is obtained when using aminocyclopentene-2 in place of isophorylamine and N-(3-methyl-2-cyclohexene) isophoronimine when using 1-methyl-1-aminocyclohexene-2 as the amine.

As previously pointed out, the new unsaturated aliphatic and alicyclic isophoronimines of the invention are particularly useful as insecticides or components of insecticidal mixtures. The preferred isophoronimines for use as insecticides are those having attached by a single bond to the imino nitrogen atom a hydrocarbon radical containing one, and only one, pair of doubly bonded carbon atoms. Those having 11 to about 15 carbon atoms are especially suitable for this application. They may be applied, either alone or in combination with other active or inactive substances, to plants, animals, fabrics and the like by spraying, dusting, dipping, etc., in the form of concentrated liquids, solutions, suspensions, dusting powders or other suitable ways. They are, for instance, advantageously used in the form of dilute solutions in solvents such as petroleum distillate, lignite tar oils, paraffin oils, naphthenes, chlorinated hydrocarbons such as dichloropropane, chlorinated ethers, ketones such as acetone, mono- and poly-hydric alcohols including fenchyl and bornyl alcohols for example, glycol ethers, or other solvents or mixtures thereof.

For use in household insecticides, where they are especially advantageous because they combine high effectiveness on insects with low toxicity to man and other warm-blooded animals, the new unsaturated isophoronimines are preferably dissolved in a light hydrocarbon oil such as highly refined, odorless kerosene with or without other insecticides. Ordinarily, from about 1% to 20%, preferably from 2% to 8%, of the new isophoronimines are used in such sprays. Solutions of the new N-alkenyl and N-cyclo-olefinic isophoronimines in odorless kerosene distillate, for instance, when placed on filter paper and exposed to the air, leave no stain after evaporation of the liquid —a feature of particular advantage in household insecticides.

For use in sprays, such, for instance, as horticultural sprays, emulsions of the N-alkenyl isophoronimine and N-cyclo-olefinic isophoronimines prepared with emulsifying agents such as partial esters or polyhydric alcohols e.g. glycerol mono-oleate, polyethylene glycol laurate or stearate, etc., or various soaps, or alkali metal salts of sulfuric acid monoesters or of organic sulfonic acids, or the like, may be advantageously used.

Among the other insecticides or fungicides with which the new compounds of the invention may be used with advantage are, for instance, pyrethrum, derris resins, rotenone, nicotine, lime-sulfur, Bordeaux mixture, copper sulfate or carbonate, sulfur, mercury compounds, arsenates, phenol, paradichlorobenzene, thiocyanates, isothiocyanates, unsaturated chlorides, unsaturated ketols such as diisophorone, and the like. The new compounds may also be mixed with or absorbed by finely divided solid materials such as wood flour, talc, clay, bentonite, sulfur, and carbon black, particularly when used as dusting insecticides.

The following results of modified Peet-Grady tests made as described on pages 193 to 197 of the 1940 "Blue Book," published by "Soap and Sanitary Chemicals," illustrate the advantageous insecticidal properties of the compounds of the invention. In all cases, solutions of 5 grams of imine per 100 cc. of kerosene were used.

| Imine | Percent 10 min. knockdown | Percent 24 hour kill |
|---|---|---|
| N-methallylisophoronimine | 100 | 56 |
| N-allylisophoronimine | 68 | 19 |
| N-isobutylisophoronimine | 36 | 23 |
| N-methallylacetylisophoronimine | 10 | 0 |

Besides the control of houseflies (Musca domestica), compositions comprising a carrier and an N-alkenyl or N-cyclo-olefinic isophoronimine may be used in the eradication or control of various other pests, including insects such, for example, as aphids, diabrotica, red spiders, thrips, etc., or bacteria and fungi, such as Aspergillus, Penicillium, Scherobium rolsii, and the like.

This application is a continuation-in-part of our copending application, Serial No. 512,042, filed November 27, 1943, now abandoned.

We claim as our invention:

1. Imines of the general formula

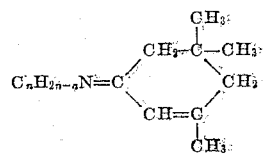

where $n$ is an integer equal to at least 2 but not greater than 18 and $a$ is an odd integer not greater than 3, the $C_nH_{2n-a}$ group containing not more than one pair of doubly bonded carbon atoms.

2. N-alkenyl isophoronimines having eleven to twenty-seven carbon atoms per molecule.

3. N-alkenyl isophoronimines of 11 to 27 carbon atoms per molecule having in the alkenyl radical a tertiary olefinic carbon atom which is directly linked to the carbon atom directly attached to the imine nitrogen atom.

4. N-(2-alkylallyl) isophoronimines having not more than 15 carbon atoms in the alkyl group.

5. N-methallylisophoronimine.

6. N-cyclohexenyl isophoronimines having 15 to 27 carbon atoms per molecule.

7. N-alkylcycloalkenyl isophoronimines of 15 to 27 carbon atoms per molecule having in the alkylcycloalkenyl radical a tertiary olefinic carbon atom which is directly linked to the carbon atom directly attached to the imine nitrogen atom.

8. N-(trimethylcyclohexenyl) isophoronimines wherein the methyl groups are attached to the No. 3 and No. 5 carbon atoms of the cyclohexenyl ring.

9. N-isophoryl isophoronimine.

VERNON E. HAURY.
SEAVER A. BALLARD.

REFERENCES CITED

The following references are of record in the file of this patent:

UNITED STATES PATENTS

| Number | Name | Date |
|---|---|---|
| Re. 22,524 | Ballard et al. | Aug. 1, 1944 |
| 2,045,574 | Adkins | June 30, 1936 |
| 2,057,044 | Meisenburg | Oct. 13, 1936 |
| 2,207,721 | Coleman | July 16, 1940 |
| 2,217,622 | Lichty | Oct. 8, 1940 |
| 2,218,587 | Reddelin | Oct. 22, 1940 |
| 2,381,526 | Throdahl | Aug. 7, 1945 |
| 2,394,280 | Williams | Feb. 5, 1946 |
| 2,425,185 | Haury | Aug. 5, 1947 |

FOREIGN PATENTS

| Number | Country | Date |
|---|---|---|
| 360,221 | Germany | Sept. 30, 1922 |
| 527,267 | Germany | June 15, 1931 |